(12) United States Patent
Jakes et al.

(10) Patent No.: US 8,481,186 B2
(45) Date of Patent: Jul. 9, 2013

(54) BATTERY MANAGEMENT FOR OPTIMIZING BATTERY AND SERVICE LIFE

(75) Inventors: Philip J. Jakes, Durham, NC (US); Daryl Cromer, Cary, NC (US); Tin-Lup Wong, Chapel Hill, NC (US); Jeremy R. Carlson, Cary, NC (US); Mark E. Cohen, Cary, NC (US); Timothy Humphrey, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1266 days.

(21) Appl. No.: 12/241,653

(22) Filed: Sep. 30, 2008

(65) Prior Publication Data

US 2010/0081037 A1    Apr. 1, 2010

(51) Int. Cl.
*H01M 2/00*      (2006.01)
(52) U.S. Cl.
USPC .............. 429/61; 429/50; 429/60; 429/90
(58) Field of Classification Search
USPC ............... 429/50, 61, 90, 318, 229
See application file for complete search history.

(56) References Cited

U.S. PATENT DOCUMENTS

| | | | | |
|---|---|---|---|---|
| 6,743,548 | B2 * | 6/2004 | Cheiky et al. | 429/144 |
| 2007/0202370 | A1 * | 8/2007 | Kuranuki et al. | 429/23 |
| 2007/0264535 | A1 * | 11/2007 | Lee et al. | 429/7 |

* cited by examiner

*Primary Examiner* — Patrick Ryan
*Assistant Examiner* — Ben Lewis
(74) *Attorney, Agent, or Firm* — Ference & Associates LLC (57) ABSTRACT

The provision of a mode in silver zinc batteries where a user can access extra capacity as an emergency reserve for times when extra capacity is needed. While this temporarily increases capacity, it does not detrimentally affect cycle life over the longer term, and it permits a silver zinc battery to essentially mimic the long term capacity and cycle life characteristics of a lithium ion battery while still affording inherent advantages associated with silver zinc batteries. In a variant embodiment, this ability to temporarily increase capacity is optimally employed at the end of a battery life cycle in a controlled "roll-off" that accords additional cycles of battery service life. In another variant embodiment, the general capability to control capacity is employed to gradually decrease the available capacity of a battery over the life of the battery, to thereby extend the battery service life.

20 Claims, 8 Drawing Sheets

BATTERY MANAGEMENT FOR OPTIMIZING BATTERY AND SERVICE LIFE

FIELD OF THE INVENTION

The present invention relates generally to arrangements for managing battery power in mobile devices such as laptops.

BACKGROUND OF THE INVENTION

Notebook computers and similar devices have long relied on batteries such as lithium-ion batteries which serve a useful purpose but are now often considered not to possess an energy density sufficient to meet emerging needs, especially in the context of more and more sophisticated notebook devices.

Figure 1:
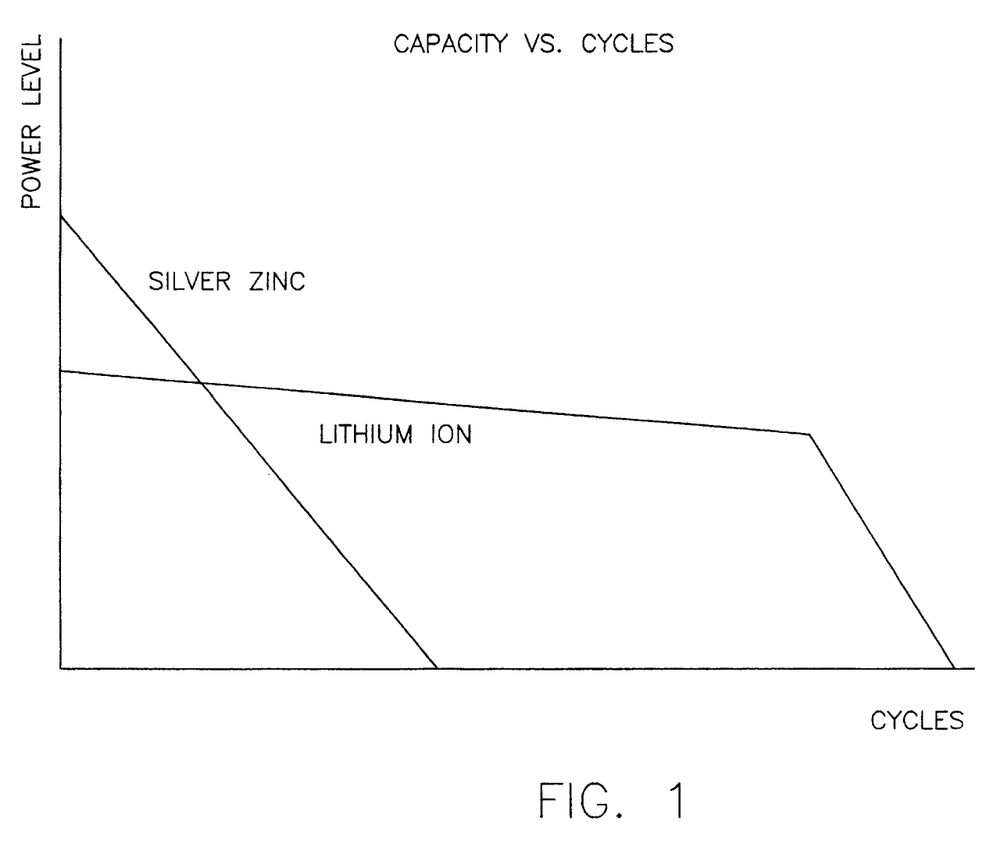
FIG. 1 graphically illustrates battery performance for a conventional silver zinc battery and a lithium ion battery.

To the extent that alternatives have been considered, silver-zinc batteries indeed provide additional energy density compared with previous notebook battery technology (e.g., lithium ion batteries), but the very nature of the silver zinc chemistry provides a very high initial battery capacity that unfortunately drops off quickly as it is cycled (i.e., goes through charge/discharge cycles). This is apparent from FIG. 1, which graphically illustrates power level (capacity) vs. charging cycles (essentially a measure of time) for conventional lithium ion and silver zinc batteries. As shown, silver zinc batteries have typically presented an even shorter service life than lithium ion batteries, meaning that they cannot typically be charged and discharged very many times before the battery wears out. Accordingly, it has long been held that the short-lived higher capacity of a silver zinc battery does not provide a sufficient tradeoff for a service life that is wholly inadequate in the eyes of notebook users.

Figure 2:
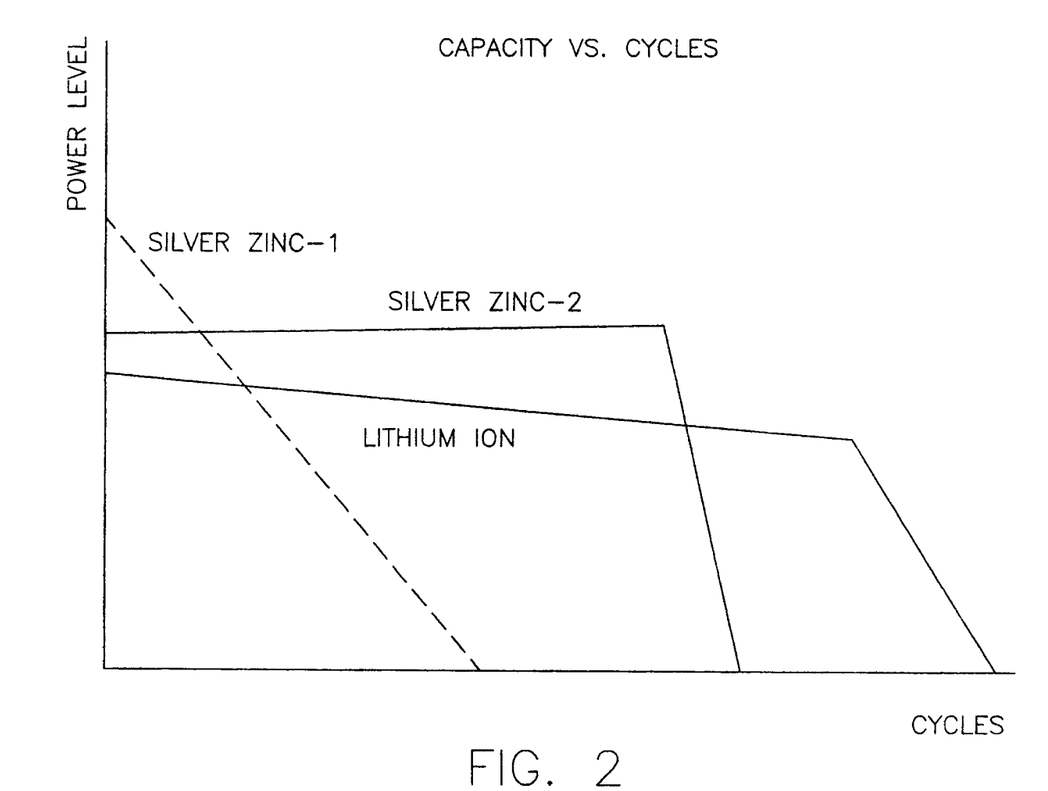
FIG. 2 is similar to FIG. 1 but also graphically illustrates battery performance for a modified conventional silver zinc battery.

In response to such shortcomings, FIG. 2 illustrates an innovation whereby the initial capacity of a silver-zinc battery (Silver-zinc 2) is artificially set or cast at a lower level than a "typical" silver-zinc battery (dotted line; Silver-zinc 1). This permits the life of the "revamped" silver-zinc battery (Silver-zinc 2) to be extended for several more cycles than in the case of the "typical" silver-zinc battery (Silver-zinc 1). However, compelling needs have still been recognized in connection with providing a more versatile and useful arrangement that takes advantage of changes in silver zinc battery capacity in ways that are of even greater benefit to the user.

SUMMARY OF THE INVENTION

Broadly contemplated herein, in accordance with at least one presently preferred embodiment of the present invention, is the provision of a mode in batteries where a user can access extra capacity as an emergency reserve for times when extra capacity is needed. While this temporarily increases capacity, it does not detrimentally affect cycle life over the longer term, and it permits a silver zinc battery to essentially mimic the long term capacity and cycle life characteristics of a lithium ion battery while still affording inherent advantages associated with silver zinc batteries.

In a variant embodiment, this ability to temporarily increase capacity is optimally employed at the end of a battery life cycle in a controlled "roll-off" that accords additional cycles of battery service life.

In another variant embodiment, the general capability to control capacity is employed to gradually decrease the available capacity of a battery over the life of the battery, to thereby extend the battery service life.

In summary, one aspect of the invention provides an apparatus comprising: a mobile device; a battery for providing power to the mobile device; the battery comprising battery cells which store power; and a battery capacity manager which controls provision of power from the battery to the mobile device; the battery capacity manager acting to: define a reserve capacity in the battery cells; and avail a selective temporary increase in battery capacity via employing the reserve capacity.

Another aspect of the invention provides a method comprising: powering a mobile device with a battery, the battery comprising battery cells which store power; and controlling provision of power from the battery to the mobile device, the controlling comprising: defining a reserve capacity in the battery cells; and availing a selective temporary increase in battery capacity via employing the reserve capacity.

Furthermore, an additional aspect of the invention provides a program storage device readable by machine, tangibly embodying a program of instructions executable by the machine to perform a method comprising: powering a mobile device with a battery, the battery comprising battery cells which store power; and controlling provision of power from the battery to the mobile device, the controlling comprising: defining a reserve capacity in the battery cells; and availing a selective temporary increase in battery capacity via employing the reserve capacity.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 3 through 8, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Figure 3:
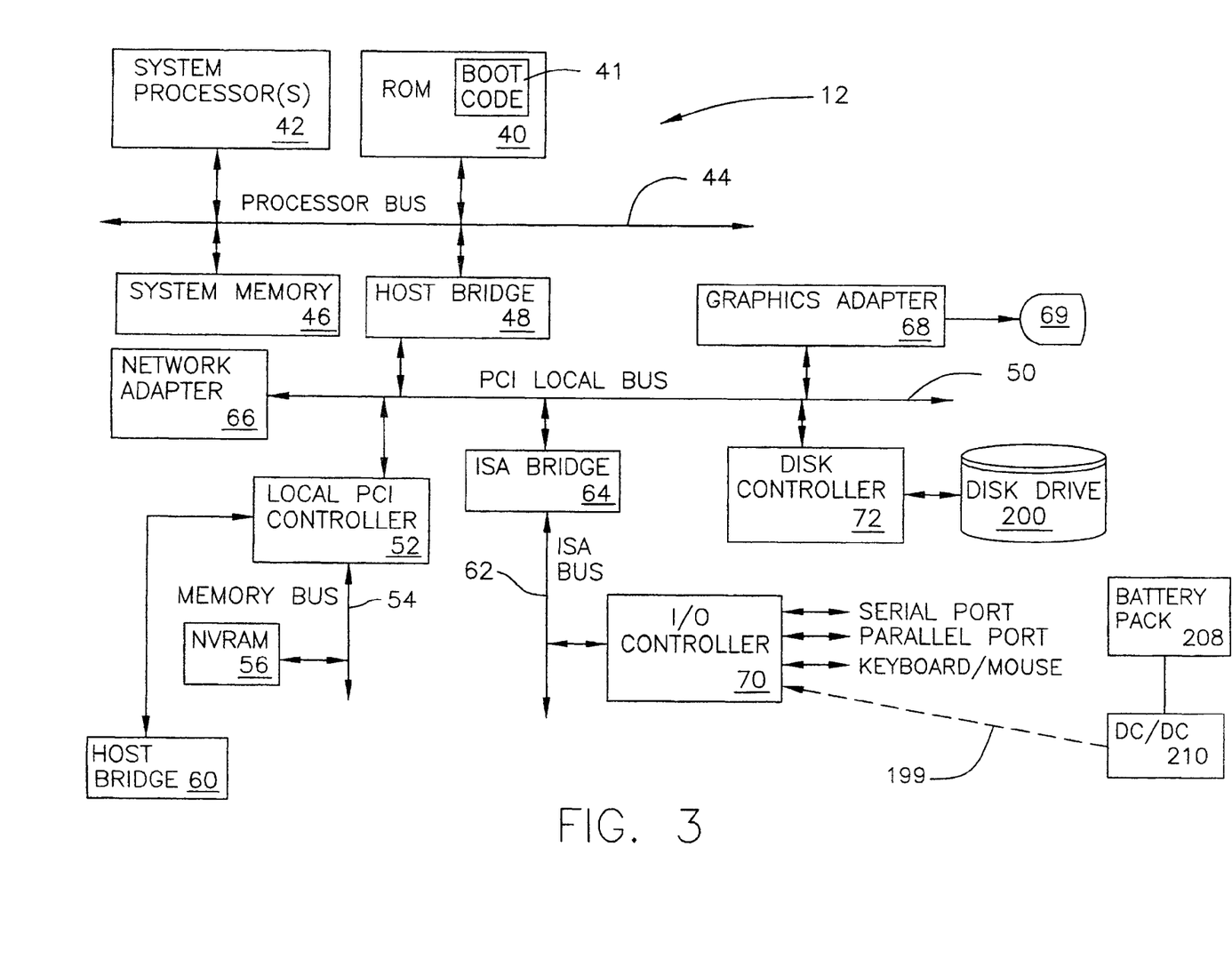
FIG. 3 schematically illustrates a computer system.

Referring now to FIG. 3, there is depicted a block diagram of an illustrative embodiment of a computer system 12. The illustrative embodiment depicted in FIG. 3 may be a notebook computer system, such as one of the ThinkPad® series of personal computers sold by Lenovo (US) Inc. of Morrisville, N.C., however, as will become apparent from the following description, the present invention is applicable to any data processing system. Notebook computers may alternatively be referred to as "notebooks", "laptops", "laptop computers" or "mobile computers" herein, and these terms should be understood as being essentially interchangeable with one another.

As shown in FIG. 3, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets and a different bus structure, as well as with any other suitable substitute components, while providing comparable or analogous functions to those discussed above.

Further illustrated in FIG. 3 is a battery pack 208 and DC/DC converter 210 which connect, via a connection 199, to the general system 12.

Figure 4:
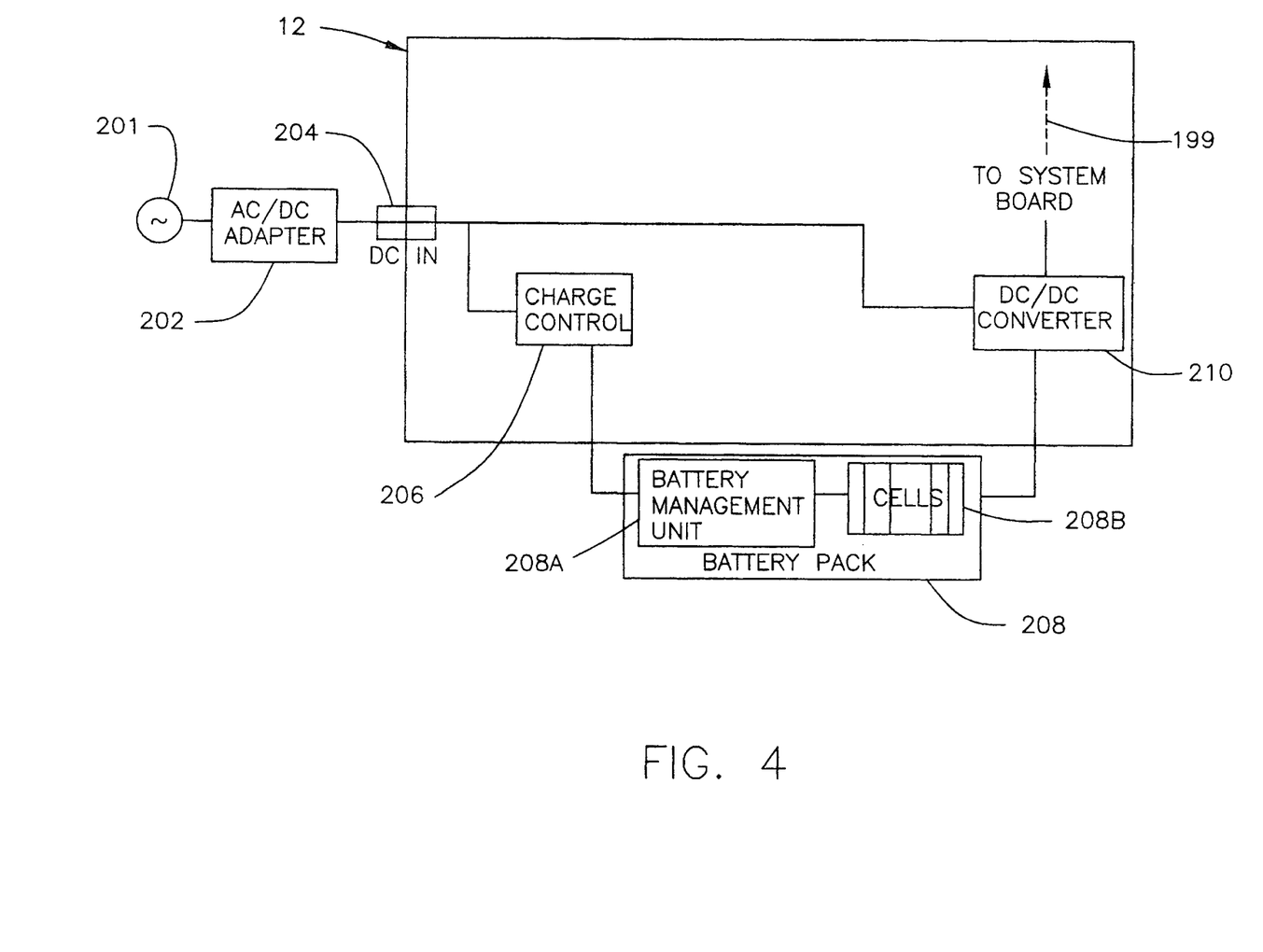
FIG. 4 schematically illustrates a computer system and battery pack.

FIG. 4 schematically illustrates a computer system 12 with a conventional battery and brick arrangement. As shown, a wall outlet 201 can accommodate a plug (not shown in detail) extending from a wire which itself leads to an AC/DC adapter, or "brick", 202. In turn, a wire from here typically can be plugged into a DC input or jack 204. Accordingly, this normally constitutes one distinct system arrangement for powering a computer and (as is well known) recharging a battery pack.

For its part, battery pack 208 is typically freely integrable into, and removable from, a system 12; here, it is shown separately from system 12 merely for the purpose of clearer illustration. Typically, battery pack 208 will include a battery management unit 208a and battery cells 208b, wherein the management unit 208a, as is very well known, manages the charge provide to and from cells 208b so as to facilitate, respectively, recharging of the cells 208b and powering of the system 12.

Brick 202 and battery pack 208, for their part, both feed into a DC/DC converter 210 as is well-known, and this in turn serves to power the system 12 (via connection 199). Further, a charge control arrangement 206 is typically included to facilitate the charging of battery cells 208b by the DC power source (which includes adapter or brick 202). Generally, charge control arrangement 206 will communicate with the battery management unit 208a (e.g. via a "SMART" battery arrangement or other serial communication standard) so as to ascertain the state of battery cells 208b and to determine the level of current (originating here from AC/DC adapter 202) needed to be provided to cells 208b by way of recharging, or continuing to recharge, the cells 208b.

In accordance with a presently preferred embodiment of the present invention, an emergency reserve is preferably provided in battery cells, which may be employed as needed in order to temporarily afford extra capacity as needed, while not being detrimental to the longer-term cycle life of the cells. More particularly, a silver zinc battery may preferably initiate operation at a lower capacity than the norm for silver zinc batteries, while allowing unused capacity to be tapped into on a short term basis as may be needed (e.g., if a user wants to make use of higher capacity for a long travel trip where recharging might be elusive).

Figure 5:
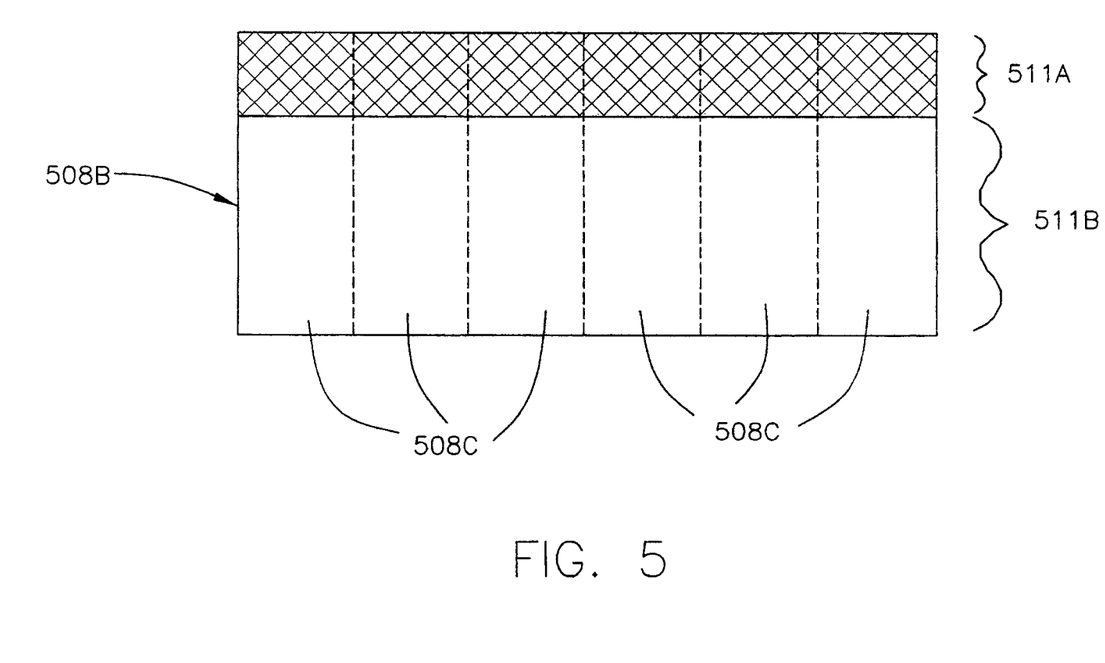
FIG. 5 schematically illustrates battery cells with a reserve capacity.

FIG. 5 schematically illustrates a set 508b of battery cells 508c (e.g., six in number). Preferably, a portion 511a of each cell 508c (as shown by shading) may be considered the aforementioned reserve capacity. Thus, while a "main" capacity 511b of each cell 508c may be employed in day-to-day or ongoing operation, the reserve capacity 511a can be accessed short-term at any time for a given short-term purpose, while such accessing over the longer haul will not greatly reduce the cycle life of the battery.

Preferably, the reserve 511a may be provided or enabled by operating the cells 508b in a range that has a higher "floor"

than zero; that is, in such day-to-day operation, the user will preferably be made aware that the battery needs to be recharged when capacity is at or approaching that floor (as opposed to conventional arrangements when such notifications are made when capacity is at or approaching zero). Further, whereas a notebook computer may conventionally switch into a hibernate mode when a capacity of zero is reached, in accordance with at least one embodiment of the present invention the computer may do so when the floor contemplated herein is reached. This floor can be chosen in accordance with essentially any desired criteria but could be, for example, around or about 20% of battery capacity.

Figures 6A, 6B:
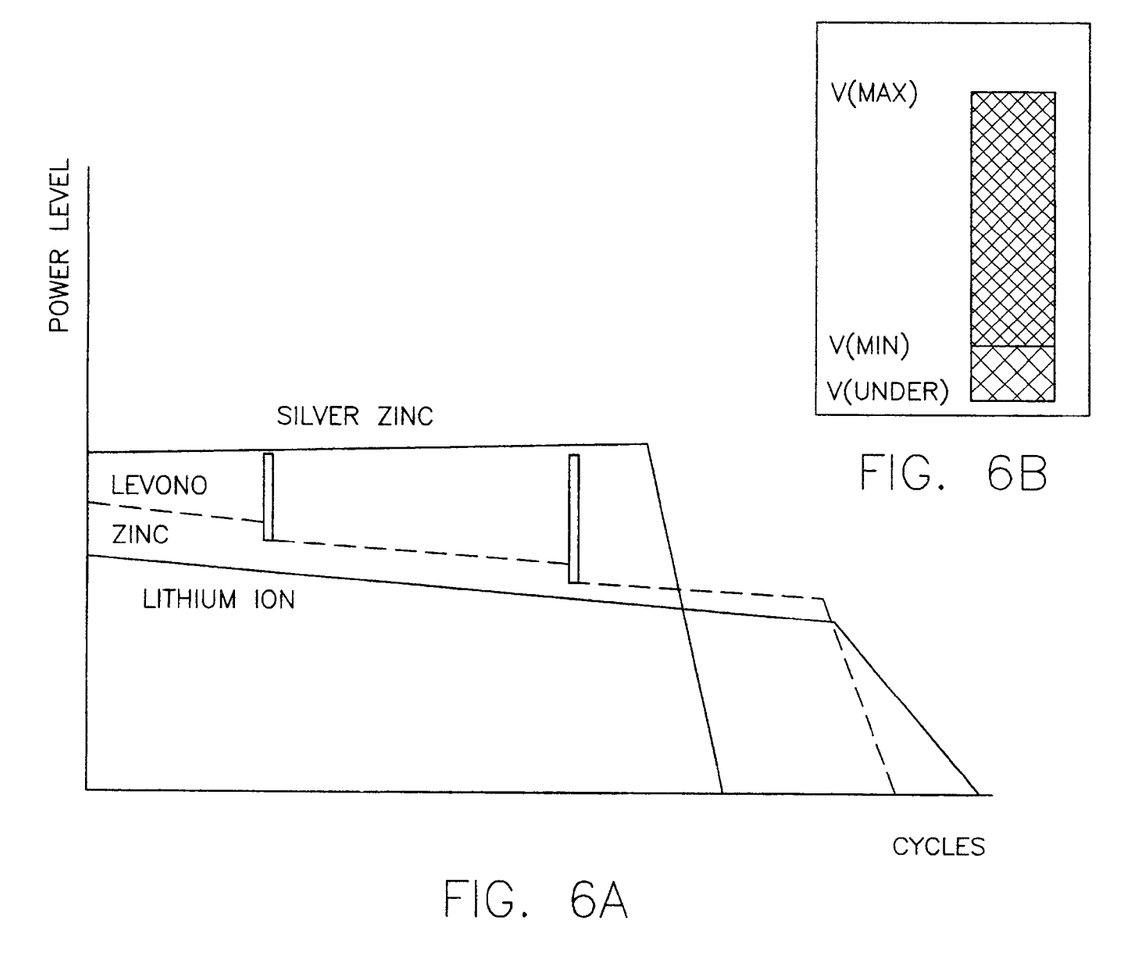
FIGS. 6a and 6b provide a graphical illustration and a voltage diagram in connection with a first mode of battery management.

FIG. 6a graphically illustrates the aforementioned phenomena in accordance with a preferred embodiment of the present invention. Shown, as before, are curves of long-term power level vs. cycles for conventional lithium ion and silver zinc batteries. Also shown, in dotted line, is a curve for a silver zinc battery in accordance with an embodiment of the present invention. As shown, the initial capacity of the "new" silver zinc battery may be chosen so as to be in general approximation of that of a conventional lithium ion battery or even a bit higher (or of course could be chosen to be some other value). (It will be appreciated that the initial capacity will be governed at least in part by the amount of reserve capacity initially set aside and, likewise, available reserve capacity will be governed at least in part by a desired initial capacity.) Thence, in accordance with short-term user needs, at timepoints 6x and 6y the user may temporarily (e.g., over the course of one or a few charge/discharge cycles) temporarily make use of the reserve capacity, which will allow the battery to operate temporarily in accordance with the "conventional" silver zinc curve shown. The rectangles at 6x and 6y not only convey this temporary "jump" to a higher overall capacity, but also illustrate that after the temporary "jump" the battery capacity will have stepped down a bit. However, assuming that the temporary use of reserve capacity is short-lived, it will be appreciated that the subsequent step-down of capacity in each instance will not be great. As can also be appreciated from FIG. 6a, the "new" silver zinc battery will ultimately deplete (over the longer term) after a number of cycles that may fall short of the number associated with the life of a lithium ion battery, but the shortfall will not be great. Accordingly, this shortfall may be viewed as a minor tradeoff for the utility attained in association with temporarily and selectively making use of a silver zinc battery's higher available capacity.

FIG. 6b graphically illustrates, via a voltage diagram, the employment of a floor in connection with a silver zinc battery according to at least one embodiment of the present invention, where V(max) is the maximum battery capacity (e.g., 100%), V(under) is the minimum battery capacity normally associated with the battery (e.g., 0&) and V(min) represents the aforementioned "floor" (e.g., 20%).

Preferably, in order to set parameters as discussed heretofore, a BMU (such as that indicated at 206a in FIG. 4) may be so configured via its own microprocessor. In other words, the BMU may preferably be pre-set so as to apply a desired floor as just discussed. User communication with, and control of, the BMU may be afforded via essentially any suitable arrangement, such as via a conventional user interface such as an applet or power management utility.

Figures 7A, 7B:
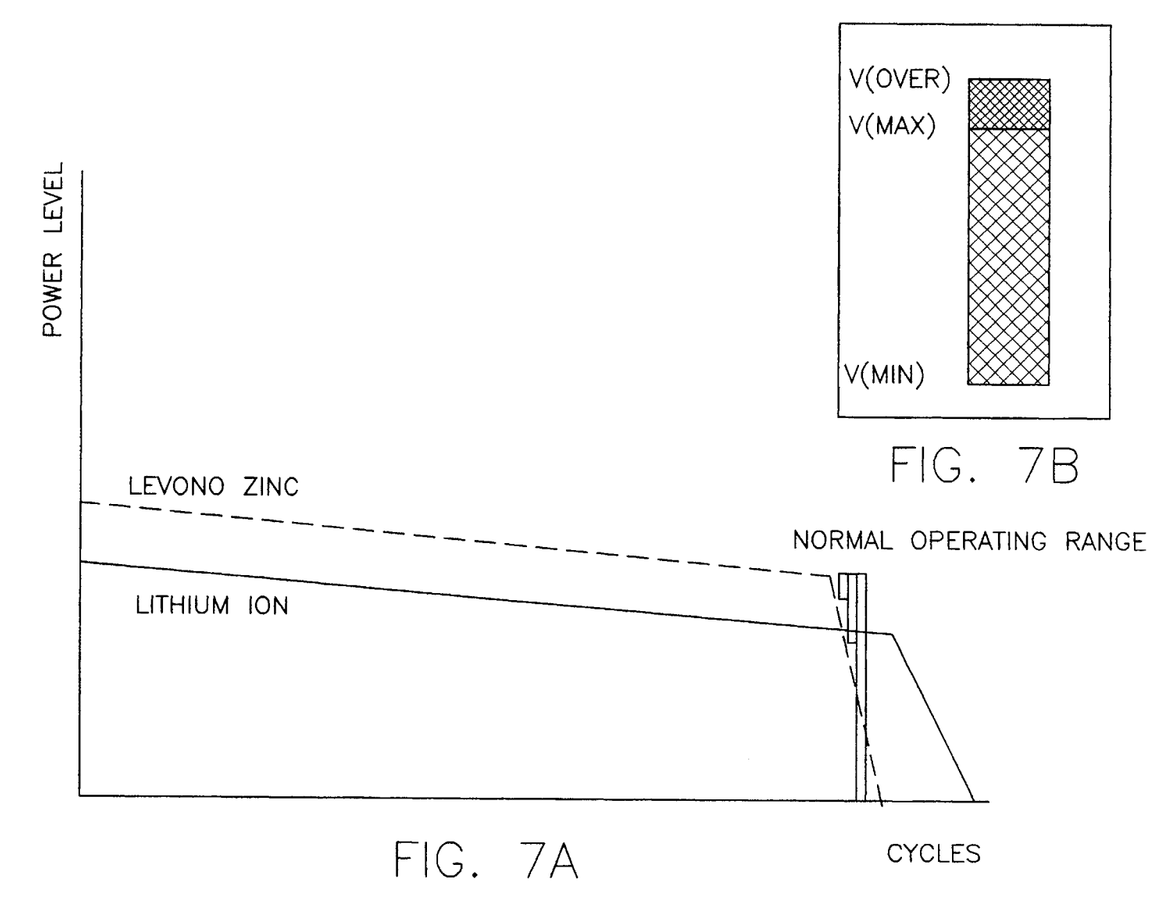
FIGS. 7a and 7b provide a graphical illustration and a voltage diagram in connection with a second mode of battery management.

FIG. 7a is similar to FIG. 6a while illustrating another embodiment in accordance with the present invention. Here, whether or not the reserve capacity of a silver zinc battery (in accordance with embodiments of the present invention) has been tapped into by the time the battery nears the end of its service life, it will be appreciated that some reserve capacity may indeed be unused and still potentially useful. Thus, a BMU may preferably undertake a controlled "roll-off" to optimally make use of this unused reserve capacity at the end of the battery's service life, wherein, as shown via the rectangles, the expected battery capacity (lower side of rectangles) can be temporarily boosted to a higher operating capacity (higher side of rectangles) to the extent that the reserve capacity will allow. Thus, and with further reference to the voltage diagram shown in FIG. 7b, to the extent that the battery may have employed up to this time a maximum capacity or ceiling not yet breached, V(max), the BMU may preferably accord a temporarily higher ceiling, V(over), to allow the reserve capacity to be fully employed in the controlled "roll-off". Preferably, this roll-off may be automatically triggered via the BMU, but conceivably it could also be presented to the user as an option as the battery nears the end of its service life. It should be understood that while this will not necessarily accord higher capacity for a considerable period of time (e.g., on the scale of months), it can and will at least accord several more charging cycles (e.g., on the order of days) that nonetheless could be of great utility to a user; if nothing else, it may be thought of as a small amount of reserve power akin to reserve gasoline in an automobile gas tank (e.g. a gallon or so) that still remains even after the dashboard fuel indicator reads "empty".

Figure 8:
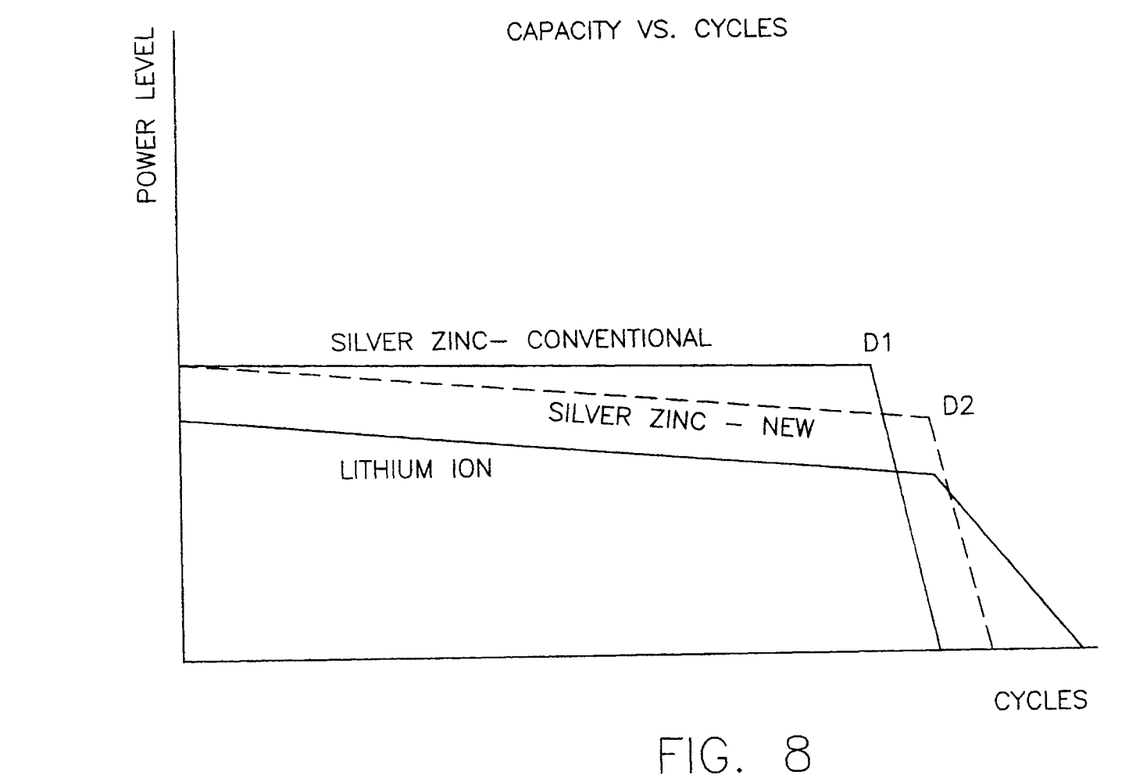
FIG. 8 provides a graphical illustration of a third mode of battery management.

FIG. 8 is similar to FIGS. 6a and 7a while illustrating another embodiment in accordance with the present invention. As with previous figures, long-term power capacity curves for conventional lithium ion and silver zinc batteries are shown. Preferably, in accordance with the curve of a "new" silver-zinc battery shown in dotted line, a gradual reduction in capacity (akin to a lithium ion battery) may be afforded as opposed to the sharper drop-off in capacity (at point D1 as shown) for a conventional silver zinc battery. This can be accomplished by altering a charge algorithm for the battery (as implemented by a BMU), e.g., by programming in a gradual decrease (e.g., where the available capacity in a given cycle can be x% of that of the previous cycle, e.g., where x can be on the order of 95-99). Thence, at point D2 as shown, there will be a drop-off to zero at the end of the battery's service life, while it can be noted that the gradual reduction in available capacity will permit some extra cycles of service life as compared to the conventional silver zinc battery.

Preferably, this effect may be brought about by actually gradually increasing the "floor" of V(min) discussed heretofore, wherein the aforementioned reserve capacity may be gradually (e.g., linearly) increased so as to gradually (e.g., linearly) reduce available capacity. Thence, the "drop-off" at the end of the service life could be brought about naturally, or could even be governed by the controlled roll-off discussed above in connection with FIGS. 7a and 7b.

It should be generally understood that, whereas examples in accordance with at least one embodiment of the present invention, as set forth hereinabove, have focused on the environment of a laptop or notebook, the battery management protocols broadly contemplated herein can of course be employed in a very wide variety of mobile device settings, such as with cell phones and personal data assistants.

It should be understood and appreciated that although specific mention has been made herein of silver zinc batteries, it should be understood that other types of batteries functionally analogous to silver zinc batteries may of course be configured in a similar manner as discussed herein in accordance with embodiments of the present invention. Accordingly, by way of illustrative and non-restrictive examples, such types of batteries could include, while of course not being limited to: versions of silver-zinc batteries that are doped with additional elements (e.g., to result in a silver-cobalt-zinc battery); batteries with alternative zinc-based chemistries (such as zinc-air); and essentially any battery technology that could readily employ the functions discussed herein. For the purposes of the present discussion, a "zinc-based" battery can be understood as including at least the doped silver-zinc batteries and batteries with alternative zinc-based chemistries just mentioned, as well as silver-zinc batteries per se. A "silver-zinc based" battery can be understood as including at least the doped silver-zinc batteries as just mentioned, as well as silver-zinc batteries per se.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:
   a mobile device;
   a battery for providing power to said mobile device;
   said battery comprising battery cells which store power; and
   a battery capacity manager which controls provision of power from said battery to said mobile device;
   said battery capacity manager acting to:
   define a reserve capacity in said battery cells; and avail a selective temporary increase in battery capacity via employing the reserve capacity;
   wherein:
   said battery capacity manager acts to define a minimum battery capacity during operation of said battery, the defined minimum battery capacity being greater than zero; and
   the reserve capacity corresponds to battery capacity less than the defined minimum battery capacity;
   wherein to avail a selective temporary increase in battery capacity via employing the reserve capacity includes discharging the battery when the battery is charged at a level below a threshold defining the minimum capacity.

2. The apparatus according to claim 1, wherein said mobile device comprises a laptop, said laptop computer comprising a main memory and a system processor, said battery acting to power said main memory and said system processor.

3. The apparatus according to claim 1, wherein said battery capacity manager acts to avail a selective temporary increase in battery capacity via temporarily decreasing the defined minimum battery capacity.

4. The apparatus according to claim 3, wherein said battery capacity manager acts to initiate service life of said battery at a lower available capacity.

5. The apparatus according to claim 1, wherein said battery capacity manager acts to define a reserve capacity in each one of said cells.

6. The apparatus according to claim 1, wherein said battery capacity manager comprises a battery management unit disposed in said battery.

7. The apparatus according to claim 1, wherein the temporary increase in battery capacity, via employing the reserve capacity, is availed responsive to a user prompt.

8. The apparatus according to claim 1, wherein said battery comprises a zinc-based battery.

9. The apparatus according to claim 1, wherein said battery comprises a silver-zinc based battery.

10. The apparatus according to claim 1, wherein said battery comprises a silver-zinc battery.

11. A method comprising:
    powering a mobile device with a battery, the battery comprising battery cells which store power; and
    controlling provision of power from the battery to the mobile device, said controlling comprising:
    defining a reserve capacity in the battery cells; and
    availing a selective temporary increase in battery capacity via employing the reserve capacity;
    wherein:
    said defining comprises defining a minimum battery capacity during operation of the battery, the defined minimum battery capacity being greater than zero; and
    the reserve capacity corresponds to battery capacity less than the defined minimum battery capacity;
    wherein to avail a selective temporary increase in battery capacity via employing the reserve capacity includes discharging the battery when the battery is charged at a level below a threshold defining the minimum capacity.

12. The method according to claim 11, wherein the mobile device comprises a laptop.

13. The method according to claim 11, wherein said availing comprises temporarily decreasing the defined minimum battery capacity.

14. The method according to claim 13, wherein said controlling further comprises initiating service life of the battery at a lower available capacity.

15. The method according to claim 11, wherein said defining comprises defining a reserve capacity in each one of the cells.

16. The method according to claim 11, wherein said availing comprises availing a temporary increase in battery capacity, via employing the reserve capacity, responsive to a user request.

17. The method according to claim 11, wherein said battery comprises a zinc-based battery.

18. The method according to claim 11, wherein said battery comprises a silver-zinc based battery.

19. The method according to claim 11, wherein said battery comprises a silver-zinc battery.

20. A program storage device readable by machine, tangibly embodying a program of instructions executable by the machine to perform a method comprising:
    powering a mobile device with a battery, the battery comprising battery cells which store power; and
    controlling provision of power from the battery to the mobile device, said controlling comprising:
    defining a reserve capacity in the battery cells; and
    availing a selective temporary increase in battery capacity via employing the reserve capacity;
    wherein:

said defining comprises defining a minimum battery capacity during operation of the battery, the defined minimum battery capacity being greater than zero; and
the reserve capacity corresponds to battery capacity less than the defined minimum battery capacity;
wherein to avail a selective temporary increase in battery capacity via employing the reserve capacity includes discharging the battery when the battery is charged at a level below a threshold defining the minimum capacity.

* * * * *